(12) United States Patent
Yamaguchi et al.

(10) Patent No.: US 7,758,115 B2
(45) Date of Patent: Jul. 20, 2010

(54) HEADREST INCLINING APPARATUS OF ACTIVE HEAD REST

(75) Inventors: Hiroyoshi Yamaguchi, Yokohama (JP); Masato Ohchi, Toyota (JP)

(73) Assignees: NHK Spring Co., Ltd., Yokohama-Shi (JP); Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 12/492,632

(22) Filed: Jun. 26, 2009

(65) Prior Publication Data

US 2009/0261635 A1    Oct. 22, 2009

Related U.S. Application Data

(63) Continuation of application No. PCT/JP2007/075176, filed on Dec. 27, 2007.

(30) Foreign Application Priority Data

| Dec. 27, 2006 | (JP) | ............................. 2006-353391 |
| Apr. 20, 2007 | (JP) | ............................. 2007-112265 |
| Apr. 20, 2007 | (JP) | ............................. 2007-112395 |

(51) Int. Cl.
    *B60R 21/00* (2006.01)
(52) U.S. Cl. ................................. 297/216.12
(58) Field of Classification Search ........... 297/216.12, 297/216.1, 408, 410
    See application file for complete search history.

(56) References Cited

U.S. PATENT DOCUMENTS

| 5,378,043 | A | 1/1995 | Viano et al. | |
| 6,375,262 | B1 * | 4/2002 | Watanabe | ................. 297/284.4 |
| 6,631,949 | B2 * | 10/2003 | Humer et al. | .......... 297/216.12 |
| 6,955,397 | B1 | 10/2005 | Humer | |
| 7,284,794 | B2 * | 10/2007 | Yamaguchi et al. | ..... 297/216.12 |
| 7,455,357 | B2 | 11/2008 | Humer et al. | |
| 7,484,798 | B2 * | 2/2009 | Yamaguchi | ............ 297/216.12 |
| 7,523,987 | B2 * | 4/2009 | Yamaguchi | ............ 297/216.12 |
| 2003/0001414 | A1 | 1/2003 | Humer et al. | |
| 2003/0011224 | A1 | 1/2003 | Humer et al. | |
| 2003/0015897 | A1 | 1/2003 | Humer et al. | |

(Continued)

FOREIGN PATENT DOCUMENTS

JP    2001-58533 A    3/2001

(Continued)

OTHER PUBLICATIONS

English Language International Search Report dated Mar. 4, 2008 issued in parent Appln. No. PCT/JP2007/075176.

(Continued)

*Primary Examiner*—Milton Nelson, Jr.
(74) *Attorney, Agent, or Firm*—Frishauf, Holtz, Goodman & Chick, P.C.

(57) ABSTRACT

A headrest inclining apparatus for moving a headrest forward by a pressure generated when a passenger moves backward relative to a seat back, in which an energizing device is provided in a support bracket, and the upper part of the support bracket is always energized backward relative to a vehicle. The support bracket is always moved along a fixed path, and is not caught by other parts or devices when moving back into the holder. The support bracket is smoothly and securely returned into the holder.

18 Claims, 18 Drawing Sheets

U.S. PATENT DOCUMENTS

2006/0202524 A1     9/2006    Yamaguchi
2008/0073951 A1*   3/2008    Hattori et al. .......... 297/216.12

FOREIGN PATENT DOCUMENTS

JP            2006-56358 A     3/2006

OTHER PUBLICATIONS

Japanese Office Action dated Sep. 16, 2008, and English translation thereof, issued in counterpart Japanese Application No. 2006-353391.

Japanese Office Action dated Jan. 6, 2009, and English translation thereof, issued in counterpart Japanese Application No. 2006-353391.

Japanese Office Action dated Sep. 16, 2008, and English translation thereof, issued in counterpart Japanese Application No. 2007-112265.

Japanese Office Action dated Jan. 6, 2009, and English translation thereof, issued in counterpart Japanese Application No. 2007-112265.

International Preliminary Report on Patentability and Written Opinion of the International Searching Authority dated Jul. 9, 2009 (6 pages), issued in counterpart International application No. PCT/JP2007/075176.

* cited by examiner

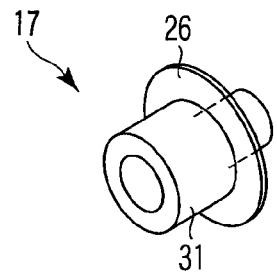
F I G. 14
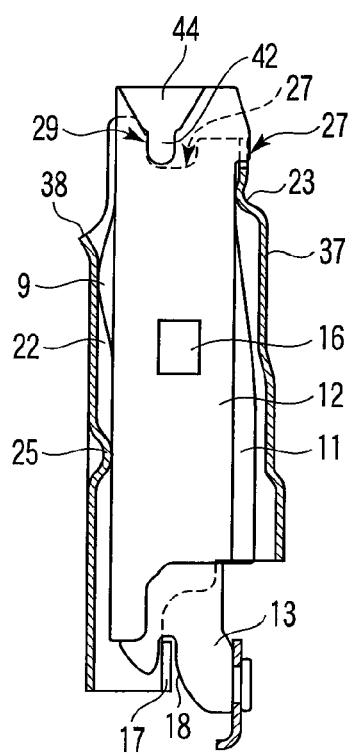
F I G. 15

US 7,758,115 B2

HEADREST INCLINING APPARATUS OF ACTIVE HEAD REST

CROSS-REFERENCE TO RELATED APPLICATIONS

This is a Continuation Application of PCT Application No. PCT/JP2007/075176, filed Dec. 27, 2007, which was published under PCT Article 21(2) in Japanese.

This application is based upon and claims the benefit of priority from prior Japanese Patent Applications No. 2006-353391, filed Dec. 27, 2006; No. 2007-112265, filed Apr. 20, 2007; and No. 2007-112395, filed Apr. 20, 2007, the entire contents of all of which are incorporated herein by reference.

BACKGROUND OF THE INVENTION

1. Field of the Invention

The present invention relates to a headrest inclining apparatus in an active headrest having a head protective function.

2. Description of the Related Art

A headrest with a head protective function (hereinafter, called an active headrest) protects a passenger's head, when a vehicle is bumped from behind and a headrest fixed to the upper part of a seat is moved forward.

As an inclining apparatus of an active headrest, a wire-drive type is known. This type has a wire drive in the lower part of a seat back, and a headrest drive in the upper part of a seat back. The wire drive and headrest drive are connected with a wire. When a vehicle is bumped from behind and a passenger is pressed to a seat back, the pressing pressure is converted into a tension of the wire by the wire drive, the tension is transmitted to the headrest drive through the wire, and the headrest drive is inclined forward.

Another type headrest inclining apparatus is disclosed in Jpn. Pat. Appln. KOKAI Publication No. 2001-58533. This type has a pressure-receiving plate in a seat back. When a vehicle is bumped from behind, the pressure-receiving plate is rotated by the pressure from a passenger and a headrest is moved forward.

BRIEF SUMMARY OF THE INVENTION

There is a problem in a conventional configuration in which a headrest drive and a wire drive are connected with a wire, or a pressure-receiving plate and a headrest are connected with a connection member. Namely, when a passenger's head is strongly bumped against a headrest, the force of the headrest is returned to the wire drive (the pressure-receiving plate), and the headrest may be pushed back to the rear direction of a vehicle. Then, the passenger's head is moved backward, and is not sufficiently protected.

To solve the above problem, a ratchet or a lock mechanism is provided in the drive. However, when a ratchet mechanism is provided, the mechanism becomes complex, and a headrest is moved back to a position where the gears of the ratchet mechanism are engaged. When a lock mechanism is provided, the headrest is not locked if a passenger's head is bumped against a headrest before the headrest is locked. Then, the headrest is moved back, and the head is not protected.

Further, in an active headrest, a headrest is movably secured to a seat. Thus, a headrest is easily moved forward, or causes rattling when pushing forward.

The rattling may be prevented by reducing a clearance between parts. However, when a clearance between parts is reduced, a headrest becomes likely to interfere with other parts in the headrest drive. When the headrest is moved back into the headrest drive after being projected from the headrest drive, the headrest may be caught by other parts. Further, when the clearance between parts is reduced, much time and labor are required to manufacture the apparatus.

It is therefore an object of the invention to provide a headrest inclining apparatus of an active headrest, in which a headrest is usually fixed stably at a specified position in a seat back, and is smoothly housed in a headrest drive after being projected from the headrest drive, and in emergency, a headrest securely functions and protects a passenger's head.

According to the invention, a headrest inclining apparatus of an active headrest is configured as follows. Namely, a headrest inclining apparatus comprises a wire drive provided in the lower part of a seat back, a headrest drive provided in the upper part of a seat back, and a tension transmission member to connect the wire drive and headrest drive. When a passenger moves backward relative to a seat back (the wire drive), the wire drive converts the pressure from the passenger into a tensile force of the tension transmission member, and the headrest drive moves the headrest forward by the tensile force. In such a headrest inclining apparatus, a projection projecting to the inside of a holder is provided in the upper part of the rear side of the holder, and a cam crest corresponding to the projection is formed in a support bracket held movably in the vertical direction within the holder.

Further, an energizing means is provided between the support bracket and holder, or between the support bracket and frame plate. The energizing means always energizes the upper part of the support bracket to the rear side of a vehicle. Therefore, the support bracket is always energized in a fixed direction when moving up and down in the holder.

When the headrest is pressed backward by a passenger's head, the cam crest fits the projection regardless of the position of the support bracket.

A first engagement part is provided at the upper end of the holder, and a second engagement part is provided in the upper part of the support bracket. A slope is formed on the front side of the first engagement part. The second engagement part contacts the slope. When the support bracket is housed, the support bracket is securely fixed to the holder.

Hereinafter, an explanation will be given on the headrest inclining apparatus of the active headrest according to the invention. The headrest inclining apparatus comprises a wire drive, a tension transmission member (a wire) to transmit a driving force, and a headrest drive.

The wire drive has a link mechanism. The wire drive is provided in the lower part of a seat back frame, for example, opposing the waist of a passenger sitting in a vehicle seat. The wire drive is connected to one end of the tension transmission member. When a passenger is moved backward relatively to a seat back, the wire drive causes tension in the tension transmission member.

The tension transmission member comprises a flexible outer tube, and a linear member provided in the outer tube. When one end of the linear member is pulled to the outer tube, the tension is transmitted to the other end of the linear member. Such a tension transmission member is also called a wire in this specification.

The headrest drive has a frame plate as a mounting substrate, a holder, a support bracket, and an actuator. The headrest drive is fixed with screws to the upper part of the seal back frame through the frame plate.

The holder is shaped cylindrical, and is provided in parallel on the left and right sides of the frame plate. Each of the left and right holders houses a support bracket movably in the longitudinal direction (the vertical direction of a vehicle). A projection is formed inside the holder.

The projection is formed at least in the upper part of the rear side of the holder (the longitudinal direction of a vehicle is assumed to be the direction in which the front and rear portions of the holder are defined). Preferably, one projection is formed on each of the front and rear sides of the holder. The projection formed on the rear side of the holder is located higher than the projection formed on the front side. Further, the projection is preferably formed wide, and linearly contacts the support bracket.

A first engaging part is provided at the upper edge of the holder. The first engagement part is formed corresponding to a second engagement part provided in the support bracket described later. The first engagement part includes at least a slope inclined downward from the front end. Therefore, when the support bracket is housed in the holder and the second engagement part engages with the first engagement part, the second engagement part is energized backward by the slope of the first engagement part.

Further, the first engagement part is preferably provided at three locations of the holder. For example, the engagement part is provided on the rear side of the holder (with respect to a vehicle), and on the left and right sides. An elongate part is formed on the rear side. The elongate part is a notch, and is formed parallel in the longitudinal direction of the holder.

An elongate part and an inclined part are formed on at least one of the left and right sides of the holder. The elongate part is a notch formed parallel along the longitudinal part of the holder as described above. The inclined part is formed following the elongate part, expanding upward from the elongate part. The front end (namely, the lower end) of the elongate part is circular. In the case that the first engagement part is provided at three locations of the holder, when the support bracket is housed in the holder, the second engagement part contacts the front side of the slope formed in the first engagement part, and the second engagement part is energized backward.

Next, an explanation will be given on an energizing means to energize the support bracket to the rear direction of a vehicle. The energizing means is a spring, for example. The spring is provided between the connection plate and actuator. The connection plate is a plate-shaped member to connect the support brackets provided on both sides. The actuator is a driving mechanism to move the connection plate in the vertical direction. The spring always presses the connection plate to the front side of a vehicle with respect to the actuator. Therefore, the upper part of the support bracket is energized to the rear side of a vehicle, taking the projection provided under the holder as a pivot. The spring may be a conical coil spring, a wave-like spiral leaf spring, a wave washer, or a flat head spring, in addition to an ordinary coil spring.

The energizing means may be formed by an elastic piece projecting from the outer casing to the rear side of the support bracket. The support bracket consists of a metallic inner cylinder and an outer casing secured to the periphery of the inner cylinder. The elastic piece is formed as one piece with the outer casing, projecting from the outer casing to the rear side of the support bracket. Such an elastic piece is used as an energizing means. The elastic piece always contacts the inside of the holder in a vertical movement range of the support bracket in the holder, and energizes the support bracket by a predetermined force.

An engagement projection is provided at the lower end of the holder. The engagement projection is formed corresponding to a notch of the support bracket to be described later. The engagement projection is formed by bending inward a metallic swaged member or a part of the holder. The engagement projection is preferably covered by an elastic material.

The support bracket is shaped cylindrical, and has a cam crest corresponding to the projection on the outside surface. A headrest support is incorporated inside of the support bracket. The headrest support is formed to permit insertion of a headrest stay, and the upper part is always exposed to the upper surface of the seat back. The headrest support locks the stay at an appropriate position, and holds the headrest at a desired height from the seat back.

The cam crest is combined with the projection, and forms a cam mechanism. The cam crest may be formed on both front and rear sides of the support bracket, or one of the cam crests may be formed flat. The cam mechanism inclines the support bracket diagonally to the front side of a vehicle.

The cam crest and projection are formed to be secured with each other. For example, when a vehicle is bumped from behind, the passenger's head is pressed to the headrest, and the headrest is pushed backward, the cam crest is secured to the projection. Therefore, the headrest is not moved back, and the passenger's head is held.

As a means for securing the cam crest to the projection, the support bracket is made of a material having an appropriate frictional resistance relative to the projection. A coefficient of friction is to be appropriately selected according to the shape and arrangement of the cam crest and the shape of the projection.

The support bracket may be made of a deformable material. When a backward force is applied to the headrest, the cam crest digs into the projection, and the head is held. Deformation may be elastic or permanent. The coefficient of friction or the flexibility of the projection may be appropriately set for the support bracket.

In the upper part of the support bracket, the second engagement part is formed corresponding to the first engagement part. The second engagement part is formed as a stage projected from the surface of the support bracket. When the support bracket is housed in the holder, the second engagement part engages with an inclined part formed at least on the front side of the first engagement part.

The second engagement part is formed at three locations of the support bracket, like the first engagement part. Concretely, the second engagement part is formed on the rear, left and right sides of the support bracket. An elongate part is formed on the rear side of the support bracket. The elongate part is formed parallel in the longitudinal direction of the support bracket. The elongate part is formed to fit into the first engagement part.

On the left and right sides of the support bracket, a stage comprising an elongate part corresponding to the first engagement part and an inclined part is formed. The elongate part is formed parallel in the longitudinal direction of the support bracket. The inclined part is formed following to and expanding from the elongate part. The distal end of the elongate part is shaped circular. When the support bracket is housed in the holder, the inclined part contacts the slope formed on the front side of the first engagement part. The support bracket is held in the holder in this state.

A notch is formed in the lower part of the support bracket. The notch is formed corresponding to the engagement projection. The notch is formed to engage with the engagement projection in the longitudinal direction (with respect to a vehicle) with a predetermined clearance. Namely, when the support bracket is held in the holder, the engagement projection engages with the notch, and the lower part of the support bracket is locked in the holder. The lower end edge of the notch is to be extended downward at least from the center of the engagement projection. When the support bracket is held in the holder, a slight clearance is to be provided between the upper edge of the engagement projection and the upper part of the notch.

The support bracket may consist of a metallic inner cylinder, and a resin outer casing having a cam crest. In this case, a notch may be provided in the lower part of the outer casing, or a notch may be formed by a resin.

The inner cylinder is formed as a cylinder having a square cross section. The inner cylinder has a space to contain the headrest support. The inner cylinder is secured to the left and right ends of the connection plate. The inner cylinders are secured parallel to each other with the same space as the space to the headrest stay. On the side of the inner cylinder, a fitting hole to lock the headrest support is formed. The engagement of a lock claw is released by pressing the inside of the fixing hole from the outside. Therefore, the headrest support can be removed from the support bracket.

The outer casing is a cylinder to be fitted to the periphery of the inner cylinder, and is secured to the inner cylinder as one piece by a lock claw. The outer casing is made of acetyl resin, for example, and generates an appropriate frictional resistance with the projection. A coefficient of friction is larger than the value by which the cam crest is secured to the projection when a backward force is applied to the headrest. The cam crest may be formed on both front and rear sides of the outer casing, or one of the crests may be formed flat.

The outer casing may be made of a material that is deformed when contacting the projection. The deformation may be elastic or permanent. An important point is that the cam crest is secured to the projection when a backward force is pressed to the headrest. As long as the above property is ensured, the material of the outer casing is not limited to resin. Metals such as aluminum or other materials may be used.

The actuator is a mechanism which receives a tension from the wire, and moves up a pair of support brackets at the same time. For example, the actuator is provided with a pair of engaged sector gears, and one of the sector gear is connected to one end of the wire. A connection pin provided in each sector gear is connected to the connection plate. When one sector gear is rotated by the wire drive, both sector gears are rotated synchronously, and the connection plate is moved up and down in parallel. Therefore, the support bracket connected to the connection plate is moved up and down. The actuator is provided with a spring member, and the support bracket is always energized in the direction to be housed in the holder. The actuator is not limited to the above configuration.

In the headrest inclining apparatus, the support bracket is securely inclined forward by the projection provided in the holder and the cam crest of the support bracket. When the support bracket is pressed backward upon collision from behind, the cam crest is secured to the projection, and the support bracket, that is the headrest, is fixed at the position receiving the backward pressure. When the pressure to the support bracket is released, the cam crest is immediately released from the projection, and the support bracket is returned into the holder. The inclined part contacts the slope, and the support bracket is housed in the holder without rattling.

In addition, as the support bracket is always energized in the rear direction of a vehicle by the energizing means, when the support bracket is housed in the holder, the returning path is always the same. Therefore, the headrest is smoothly and certainly returned to the original position without causing the support bracket to be caught by other parts and members in the headrest drive. Further, when the support bracket is held in the holder, the notch fits the engagement projection. This prevents rattling of the lower part of the support bracket.

As described above, when a vehicle is bumped from behind, the headrest is inclined forward and fixed without moving back, and a passenger's head can be securely protected. After the operation, the headrest is immediately returned to the original position, and causes no problem in use thereafter. In the normal state, the second engagement part contacts the slope of the first engagement part in the upper part of the support bracket, two projections of the holder contact the support bracket, and the notch fits the engagement projection in the lower part of the support bracket, and the headrest is securely held in the seat back without rattling while a vehicle is running, and the headrest is not inclined largely forward even if the headrest is pushed forward from the rear side.

Therefore, a headrest inclining mechanism having a high commercial value can be provided.

BRIEF DESCRIPTION OF THE SEVERAL VIEWS OF THE DRAWING

FIG. 14 is a perspective view of an engagement projection;

FIG. 15 is a sectional view of another example of a holder;

DETAILED DESCRIPTION OF THE INVENTION

An explanation will be given on an embodiment of a headrest inclining apparatus according to the present invention with reference to the accompanying drawings.

Figure 24:
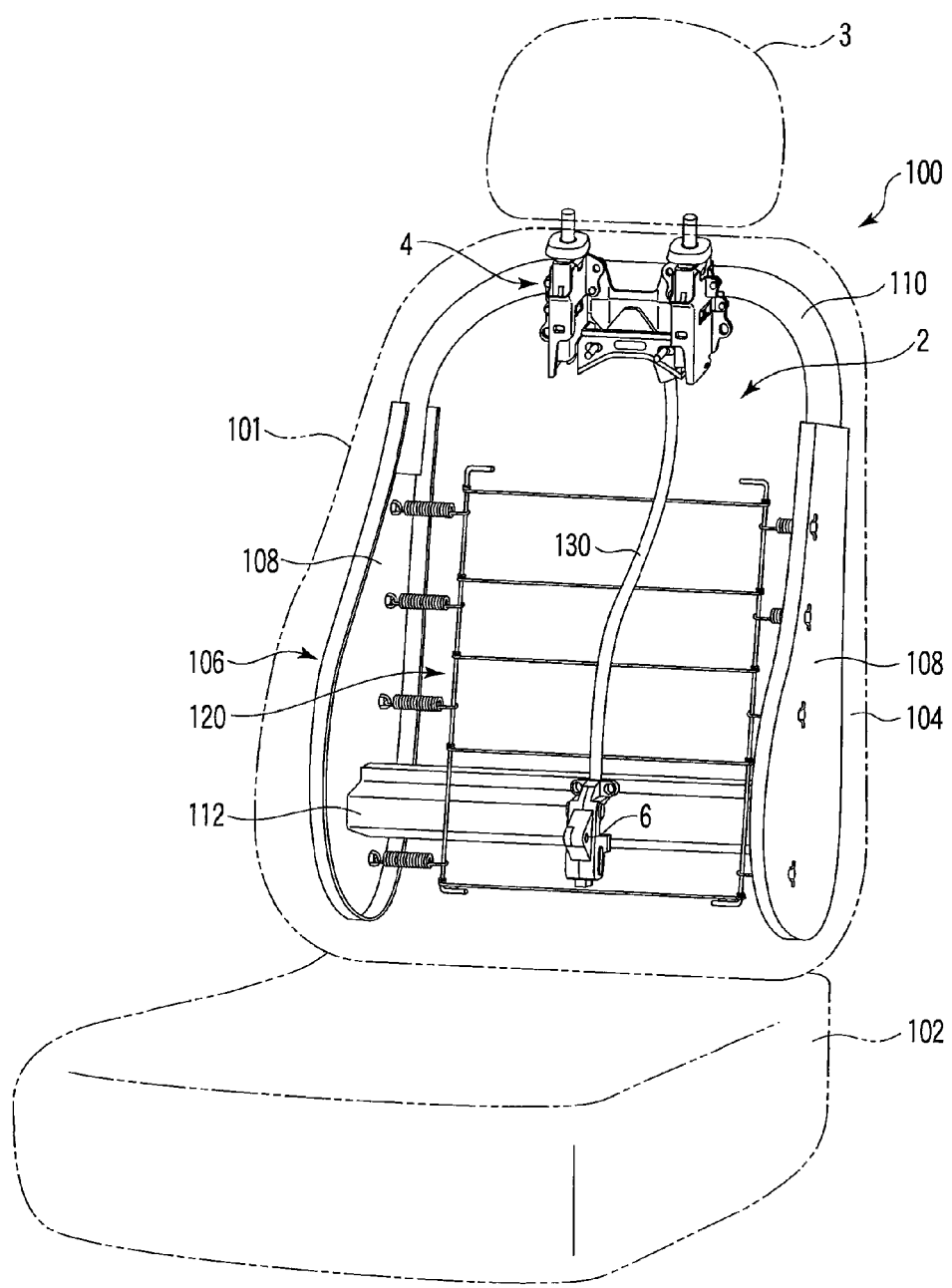
FIG. 24 is a perspective view showing the whole headrest inclining apparatus.

FIG. 24 shows a vehicle seat 100 provided with a headrest inclining apparatus 2. The vehicle seat 100 comprises a seat base 102, a seat back 104, a headrest 3 provided in the upper part of the seat back 104. The seat back 104 has a seat back frame 106. A cushion material (not shown) is provided around the seat back frame 106. A surface cover 101 is stuck to the outside surface of the cushion member as indicated by a chain double-dashed line.

The seat back frame 106 is formed along the outside shape of the seat back 104. The seat back frame 106 comprises side frames 108 provided on both left and right sides, an upper frame 110, and a lower frame 112. The upper frame 110 connects the left and right side frames 108 in the upper part of the side frames 108. The lower frame 112 connects the side frames 108 in the lower part of the side frames 108.

On the front side of the upper frame 110, a headrest driving mechanism 4 is provided as a headrest drive. On the front side of the lower frame 112, a wire driving mechanism 6 is provided as a wire drive. Between the headrest driving mechanism 4 and wire driving mechanism 6, a wire 130 is provided as a tension transmission member. By inserting a stay of the headrest 3 of the headrest 3 into the headrest driving mechanism 4, the headrest 3 is fixed to the headrest driving mechanism 4. A spring member 120 is fixed to the seat back frame 106 so as to cover the inside of the seat back frame 106.

The wire 130 has a double structure consisting of an outer tube 132, and a metallic stranded wire 134 provided inside the outer tube 132. The wire 130 transmits tension to the other end of the metallic stranded wire 134, by pulling the metallic stranded wire 134 with respect to the outer tube 132.

Figure 1:
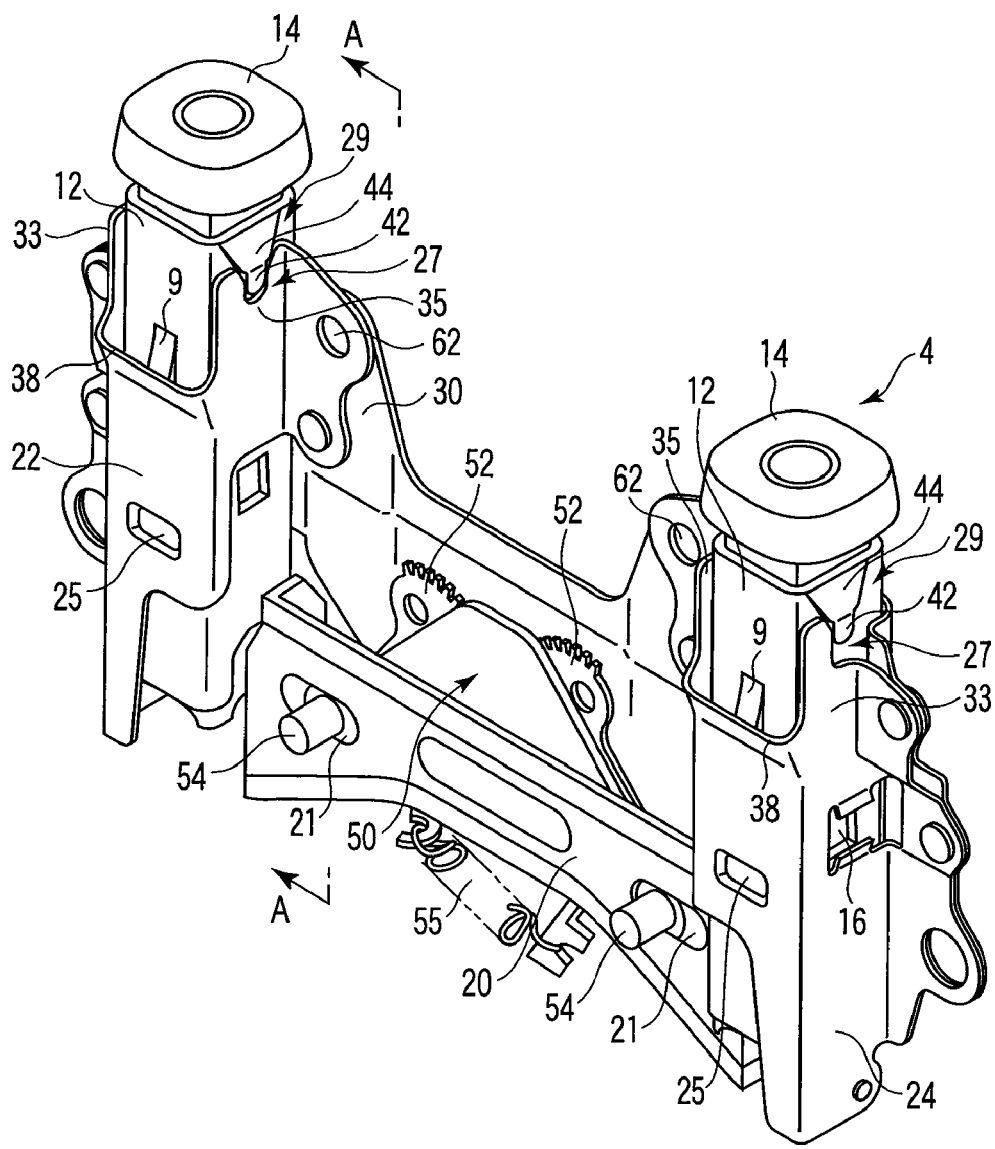
FIG. 1 is a perspective view of an embodiment of a headrest driving mechanism according to the present invention.

FIG. 1 shows the headrest driving mechanism 4. The headrest driving mechanism 4 comprises a frame plate 30 as a substrate, holders 22 and 24 provided on the left and right sides of the frame plate 30, a pair of support bracket 12 held inside the holders 22 and 24, and an actuating mechanism 50 as an actuator provided on front side of the frame plate 30.

The frame plate 30 is a metallic plate having screw holes 62 in the upper part. The frame plate 30 is fixed to the upper frame 110 through the screw holes 62 as shown in FIG. 24. The holders 22 and 24 are square cylinders. The holders 22 and 24 are formed by caulking a "U"-shaped member and fixing the member to the frame plate 30. The whole frame plate 30 may be formed by resin, if a sufficient strength is ensured.

The holders 22 and 24 are provided parallel with each other. The holders 22 and 24 are provided horizontally symmetrical. Only the holder 22 will be explained, and an explanation of the holder 24 will be omitted.

Figure 6:
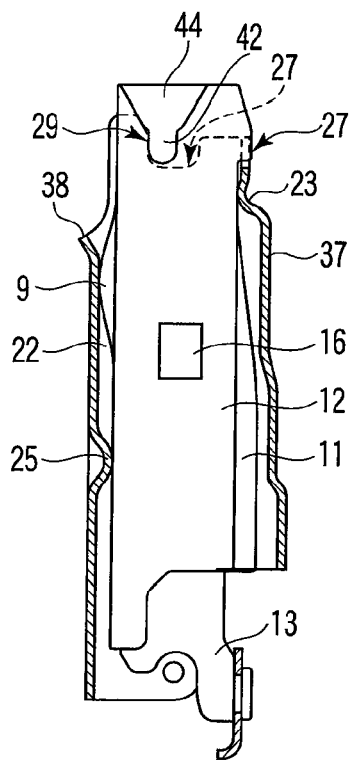
FIG. 6 is a sectional view of a holder.

FIG. 6 shows a sectional view of the holder 22. FIG. 6 shows the state that the support bracket 12 is housed in the holder 22. The holder 22 has an upper projection 23 and lower projection 25 inside. The upper projection 23 is formed on the rear side (against a vehicle) of the holder 22, and the lower projection 25 is formed on the front side.

Figure 4:
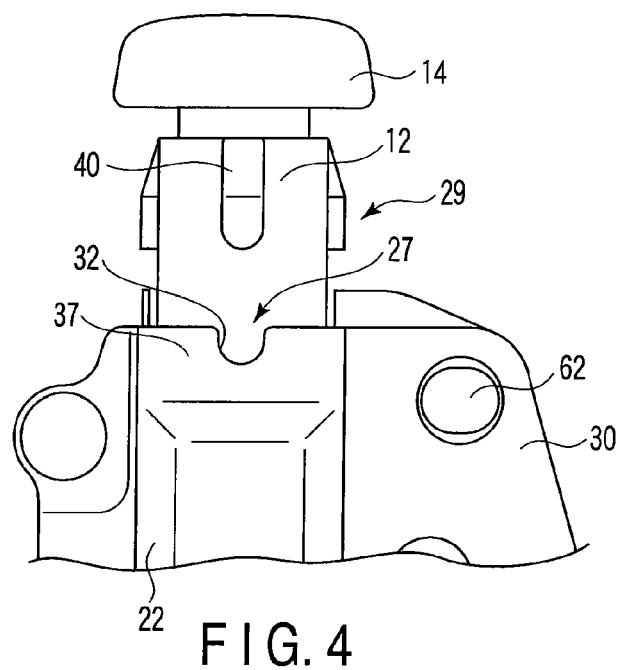
FIG. 4 is a partial rear view of the headrest driving mechanism of FIG. 1.
Figure 5:
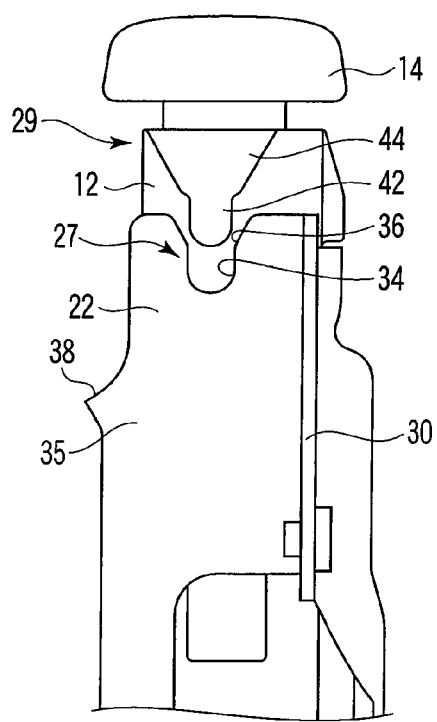
FIG. 5 is a partial rear view of the headrest driving mechanism of FIG. 1.

The holder 22 has a first engagement part 27 formed as a notch at the upper end. The first engagement part 27 is provided on the left sidewall 33, right sidewall 35 and rear wall 37 of the holder 22. A notch 32 is formed on the rear wall 37 as an elongate part extending parallel in the vertical direction (in the longitudinal direction of the holder 22), as shown in FIG. 4. On the right sidewall 35 (in the inward direction of a vehicle), a notch 34 is formed as an elongate part extending parallel in the vertical direction (in the longitudinal direction of the holder 22), and an opening 36 is formed following the notch 34 as an upwardly inclined opening, as shown in FIG. 5. The front upper end edge 38 of the holder 22 is located under the upper end edges of the rear and left/right sidewalls 37 and 33, 35 (in other words, the front upper end edge 38 is located close to the first engagement part 27), and is bent to project toward the front side, as shown in FIG. 6.

Figure 2:
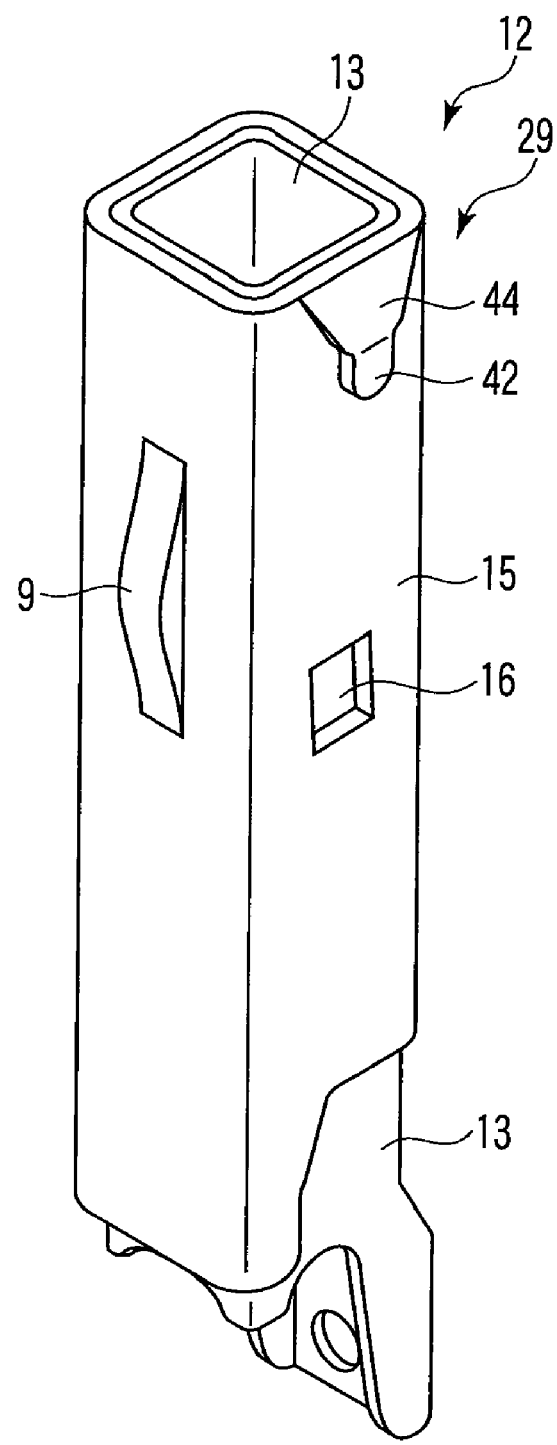
FIG. 2 is a perspective view of a support bracket.

The left and right support brackets 12 have the same shape, and are fixed to the left and right sides of the connection plate 20 (refer to FIG. 1) as a connection member. The support bracket 12 consists of an outer casing 15 fitted to the periphery of the inner cylinder 13 as shown in FIG. 2. The support bracket 12 is housed in the holder 22 as shown in FIG. 6.

The inner cylinder 13 is a metallic cylinder, and is formed by press working, for example. The headrest support 14 is inserted into the inner cylinder 13. From the upper side. The upper part of the headrest support 14 is always exposed to the upper side of the seat back 104. The inside of the headrest support 14 is formed to permit insertion of the stay of the headrest 3. The headrest support 14 locks the inserted stay at an appropriate position. Therefore, the headrest 3 is held at an appropriate height in the upper part of the seat back 104.

The headrest support 14 is fixed by engaging an engagement piece (not shown) with a fixing hole 16 formed on the sidewall of the support bracket 12. The headrest support 14 can be removed from the support bracket 12, by disengaging the engagement piece from the fixing hole 16 by pushing the engagement piece from the sideway.

The outer casing 15 is made of acetyl resin, and is fitted to the periphery of the inner cylinder 13 and secured to the inner cylinder 13 as one piece by an engagement part (not shown). A guide 9 (refer to FIG. 2) is formed on the front side (with respect to a vehicle) of the outer casing 15. A rear cam 11 (refer to FIG. 3) is formed on the rear side of the outer casing 15.

The guide 9 is provided in the part higher than the center in the vertical direction of the support bracket 12, as shown in FIG. 2. The part lower than the guide 9 is formed flat. The rear cam 11 is formed as a gentle slope from the part slightly above the center in the vertical direction of the support bracket 12, to the lower end of the support bracket. A cam mechanism is formed by combining the rear cam 11 with the upper projection 23, and combining the front side of the outer casing 15 with the lower projection 25. Such a cam mechanism inclines the support bracket 12 forward, when the support bracket 12 is moved upward from the holder 22.

Further, the cam mechanism is configured to hold the headrest 3, when a backward force is applied to the headrest 3 in the state in which the support bracket 12 is moved up out of the holder 22. Namely, the cam mechanism is constructed so that the headrest 3 is not returned downward by a load F applied to the headrest 2 (shown in FIG. 7) regardless of the positions of the support bracket 12 with respect to the holder 22.

For example, the load applied from the head to the headrest is assumed to be F, and the load F is assumed to be received at the cam (rest and two contact points a and b. A vertical drag Na is generated at the point a, and a vertical drag Nb is generated at the point b. Assuming that the cam crest and projection contact at the point a with an angle of $\Theta$, a force to return the headrest downward is Na sin $\Theta$.

Frictional forces at the contact points a and b are $\mu$Na and $\mu$Nb. The $\mu$ is a coefficient of friction. Therefore, as shown by an equation 1, when the frictional force ($\mu$Na+$\mu$Nb) is larger than the force Na sin $\Theta$ to return the headrest downward, the headrest is not returned downward by the frictional force. Further, an equation 2 is obtained by modifying the equation 1.

$$\mu(Na+Nb) > Na \sin \Theta \quad \text{(Equation 1)}$$

$$\mu Na + \mu Nb - Na \sin \Theta = Na(\mu - \sin \Theta) + \mu Nb > 0 \quad \text{(Equation 2)}$$

A concrete explanation will be give below. The upper projection 23 is assumed to be a point a, and the lower projection 25 is assumed to be a point b. The coefficient of friction between the outer casing 15, upper projection 23 and lower projection 25 is assumed to be u, and the inclination of the rear cam 11 is assumed to be Θ.

When the load F is applied to the headrest 3, the drags Na and Nb are generated in the upper projection 23 (point a) and lower projection 25 (point b). Therefore, the frictional force μNa=μNb is generated. The force Na sin θ to return the headrest downward is generated in the support bracket 12.

When the outer casing 15 is assumed to be made of POM (resin) and the upper and lower projections 23 and 25 are assumed to be made of iron, the value of μ becomes approx. 0.2. When the 0 is assumed to be 8.4° (the maximum design inclination of the rear cam 11), Na (0.2−sin 8.4)+0.2Nb is obtained from the equation 2. The value of 0.054Na+0.2Nb becomes larger than 0, and the equation 2 is established. Therefore, a step-less lock lockable at any position is established.

Therefore, the support bracket 12 is not returned downward by the load F applied to the headrest 3, regardless of the position of the support bracket with respect to the holder 22. The support bracket 12 is locked (held) at the position receiving the force.

Figure 3:
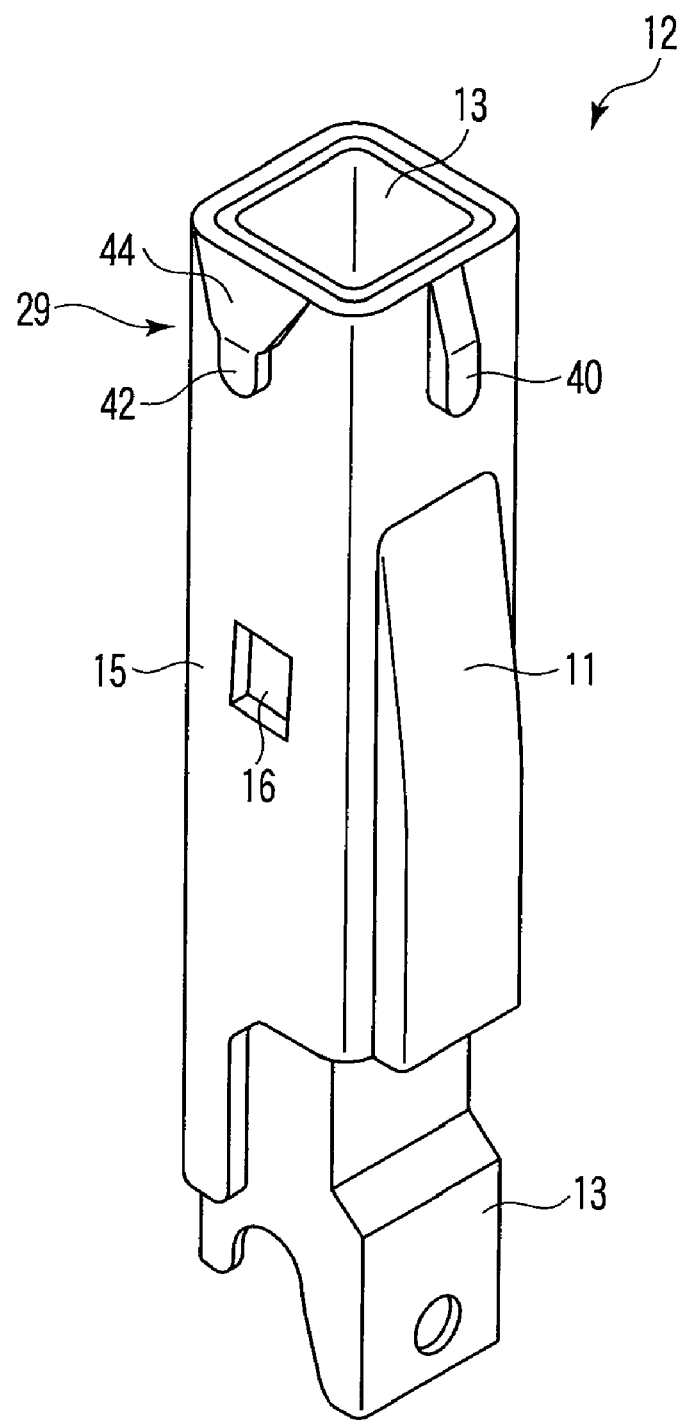
FIG. 3 is a perspective view of a support bracket.

A second engagement part 29 is formed in the upper part of the outer casing 15. The second engagement part 29 is provided on the rear side, and left and right sides of the outer casing 15. On the rear side of the outer casing 15, a stage 40 is formed as an elongate part parallel to the longitudinal direction of the outer casing 15, as shown in FIG. 3 and FIG. 4. On the left and right sides of the outer casing 15, a stage 42 as an elongate part and an expanding part 44 as an inclined part are formed as shown in FIG. 2 and FIG. 5. The stage 42 extends parallel to the vertical direction (the longitudinal direction of the inner cylinder 13). The expanding part 44 is expanded upward from the stage 42.

A spring member 55 is provided in an actuating mechanism 50 described later. The support bracket 12 is always energized by the spring member 55 in the direction of housing the support bracket 55 in the holder 22. When the support bracket 12 is housed in the holder 22, the expanding part 44 of the outer casing 15 contacts the inclined part of the front side (with respect to a car body) of the expanding part 36 of the holder 22. Namely, when the support bracket 12 is housed in the holder 22 by the spring member 55, the expanding part 44 contacts the inclined part of the front side of the expanding part 36 in the state in which the front and rear sides of the support bracket 12 contact the upper and lower projections 23 and 25. A force of pulling down along the slope of the expanding part 36, or diagonally backward, is applied to the support bracket 12. The rear side of the support bracket 12 contacts the upper projection 23, and the front side of the support bracket 12 contacts the lower projection 25. Therefore, the support bracket 12 is held in the holder 22 without, rattling both in the longitudinal and vertical directions.

The actuating mechanism 50 has a pair of sector gears 52. One of the sector gears 52 is connected to one end of the metallic stranded wire 134 of the wire 130. The other end of the wire 130 is connected to the wire driving mechanism 6. Each sector gear 52 has a connection pin 54. The connection pin 54 is inserted into a connection hole 21 of the connection plate 20. When the sector gear 54 is rotated by the wire 130, the connection pin 54 is moved up and down, and the connection plate 20 is moved up and down accordingly. The configuration of the actuating mechanism 50 is not limited to the above.

The wire drilling mechanism 6 has a "V"-shaped bent link mechanism. When the wire driving mechanism 6 receives a pressure from the front direction of a vehicle, the bent part of the link mechanism is pressed and deformed to be flat. As a result, the metallic stranded wire 134 of the wire 130 connected to one end of the link mechanism is pulled.

Next, an explanation will be given on the function of the above-described headrest inclining apparatus 2.

The headrest 3 is fixed to the upper part of the vehicle seat 100 by inserting the stay of the headrest 3 into the headrest driving mechanism 4. In the headrest driving mechanism 4, the support bracket 12 is housed in the holder 22, as shown in FIG. 6. The first engagement part 27 engages with the second engagement part 29, and the headrest 3 is securely fixed to the vehicle seat 100. Therefore, a passenger's head is appropriately held while a vehicle is running.

When a vehicle is bumped from behind, for example, the back of a passenger sitting in the vehicle seat 100 is pressed to the seat back 104. Then, the wire driving mechanism 6 actuates and pulls the metallic stranded wire 134 of the wire 130. The sector gear 52 is rotated by the tensile force of the wire 130, and the connection plate 20 is instantly moved upward.

Figure 7:
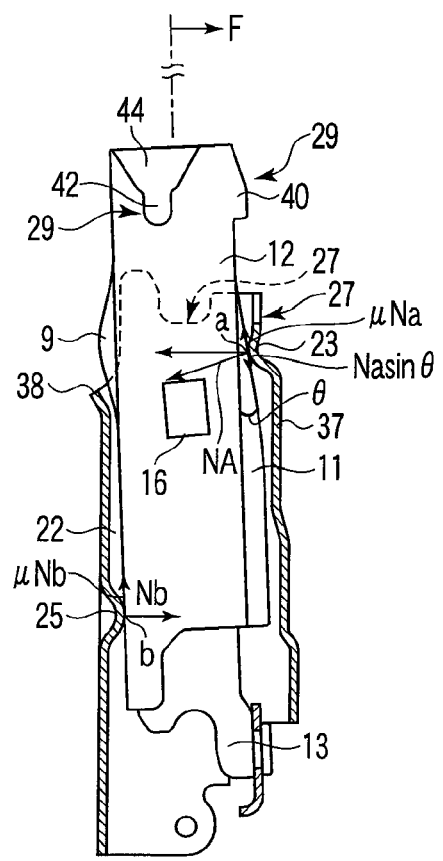
FIG. 7 is a sectional view of a holder.
Figure 8:
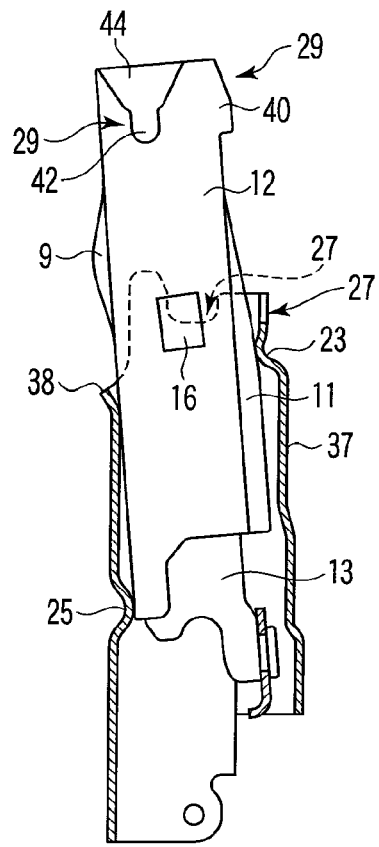
FIG. 8 is a sectional view of a holder.
Figure 9:
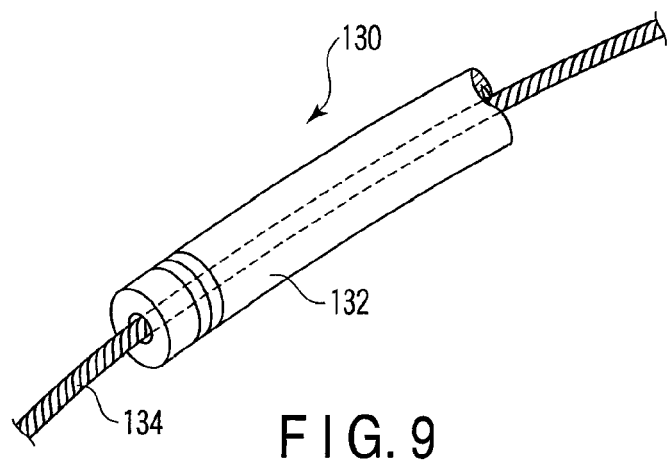
FIG. 9 is a partial perspective view of a wire.

FIGS. 6 to 8 shows the states in which the connection plate 20 is moved upward from the normal state, and the support bracket 12 is inclined. First, as shown in FIG. 6, the support bracket 12 is housed in the holder 22. At this time, the first and second engagement parts 27 and 29 are engaged as explained above, and the headrest 3 is securely fixed to the vehicle seat 100 without rattling in both front/rear and left/right directions.

When the support bracket is moved upward a little, the first and second engagement parts 27 and 29 are disengaged. As shown in FIG. 7, the guide 9 is removed from the upper end of the holder 22, and at the same time, the rear cam 11 contacts the upper projection 23 in the state in which the lower projection 25 contacts the front side of the support bracket 12. As a result, the support bracket 12 is inclined to the front side of a vehicle.

The support bracket 12 is moved to the highest position, in the state in which the rear cam 11 contacts the upper projection 23, and the front side of the support bracket 12 contacts the lower projection 25. Therefore, the support bracket 12 is continuously inclined and moved forward. FIG. 8 shows the state in which the support bracket 12 is moved to the highest position. As shown in FIG. 8, the upper end of the holder 22 contacts the lower projection 25 on the front side of the support bracket 12, and the rear cam 11 contacts the upper projection 23 on the rear side, inclining largely to the front side of a vehicle.

Further, it is assumed that a passenger's head is pressed to the headrest 3, and a backward force is applied to the support bracket 12, in the state in which the headrest 3 is moved upward. The rear cam 11 contacts the upper projection 23, the front side of the support bracket 12 contacts the lower projection 25, and they are secured by the frictional resistance of the outer casing 15. Therefore, the headrest 3 is not pushed back downward, regardless of its position, and a passenger's head can be securely protected.

When the backward force to the support bracket 12 is released, the support bracket 12 is immediately housed in the holder 22 by the spring member 55. As a result, the headrest 3 is returned to the normal position.

Figure 10:
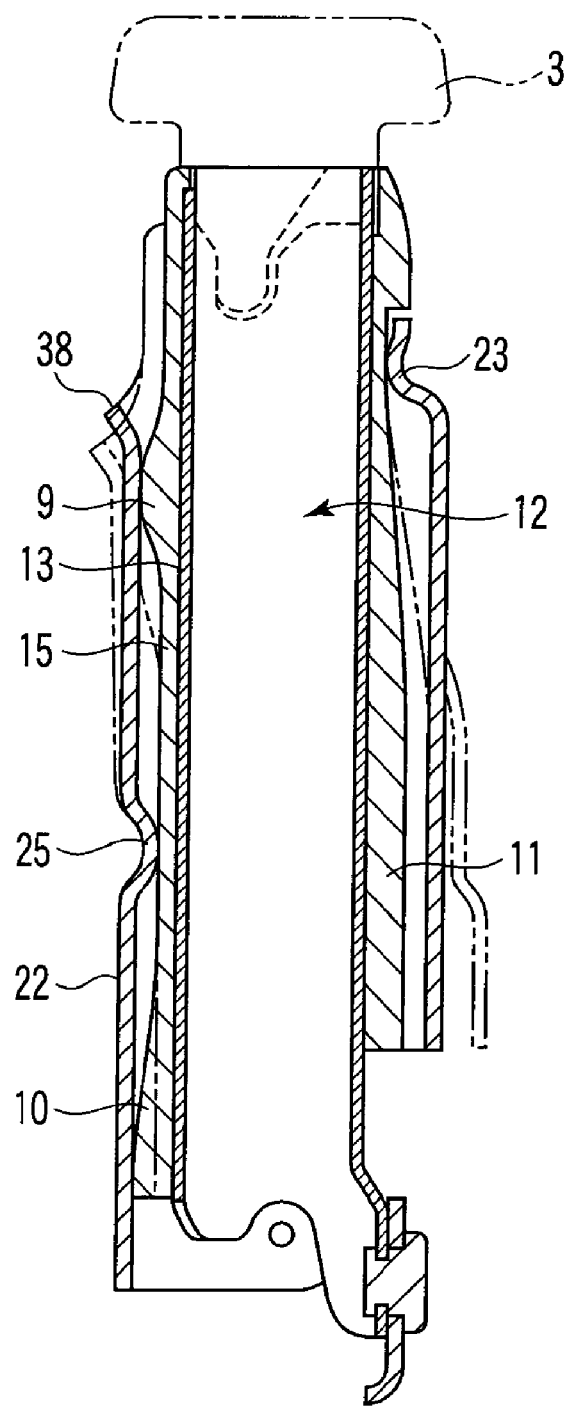
FIG. 10 is a partial rear view of another example of a headrest driving mechanism.

FIG. 10 shows another example (a second example) of the cam mechanism. In the second example, the support bracket 12 has a guide 9 and a front cam 10 on the front side, and a rear cam 11 on the rear side. The holder 22 has an upper projection 23 corresponding to the rear cam 11, and a lower projection 25 corresponding to the front cam 10.

The front cam 10 is formed in the lower part of the guide 9, and is gradually inclined forward from the upper to the lower end. The rear cam 11 is inclined backward from the upper to the lower end, but formed as a gentle slope compared with the example described above (a first example indicated by a chain double-dashed line).

The upper projection 23 and lower projection 25 are not largely changed from those in the above example. In the holder 22, the backward expansion of the lower part of the upper projection 23 is smaller than the above example (indicated by a chain double-dashed line), and the upper part of the lower projection 25 is extended upward higher and is projected forward less than in the above example.

In such a cam mechanism, when the support bracket 12 is moved upward by the actuating mechanism 50, the support bracket 12 is inclined forward by the upper and lower projections 23 and 25, and the rear and front cams 11 and 10. Compared with the above example, the upper end edge 38 is located higher than in the second example, and the force to hold the support bracket 12 is increased. The holder 22 is formed thin in the longitudinal direction.

Figure 11:
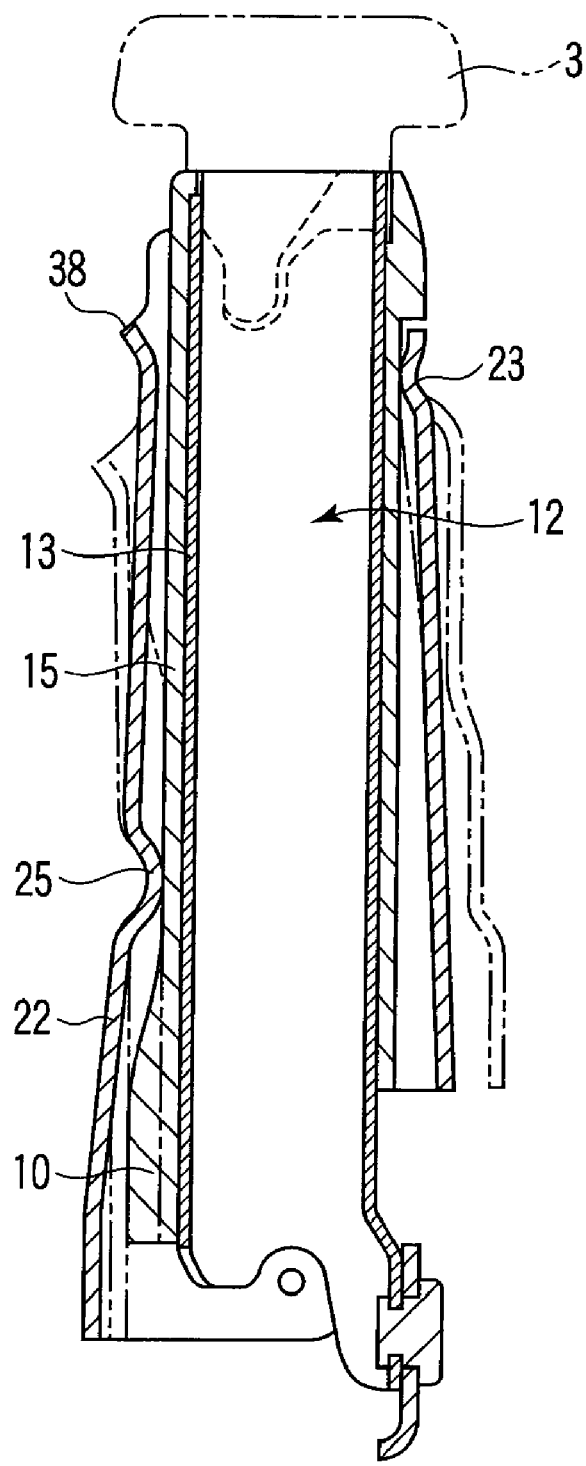
FIG. 11 is a partial rear view of another example of a headrest driving mechanism.

FIG. 11 shows a third example of a cam mechanism. In the third example, the support bracket 12 has a front cam 10 on the front side, and is formed flat on the rear side. The holder 22 has an upper projection 23, and a lower projection 25 corresponding to the front cam 10.

The front cam 10 is located in the lower part of the support bracket 12, and is largely inclined forward from the upper to the lower end (compared with the first example indicated by a chain double-dashed line).

The upper projection 23 and lower projection 25 are not largely changed from those in the first example. The backward expansion of the lower part of the upper projection 23 is smaller than the first and second examples (indicated by a chain double-dashed line). In the upper part of the lower projection 25, the upper end edge 38 is located higher than in the first example (indicated by a chain double-dashed line) and second example.

In such a cam mechanism, when the support bracket 12 is moved upward by the actuating mechanism 50, the support bracket 12 is inclined forward by the upper projection 23 and the rear side of the support bracket 12, and the lower projection 25 and front cam 10. Compared with the above example, the backward projection is small in the third example.

In any example, when a backward force is applied to the headrest 3, the cam mechanism is locked. As a result, the support bracket 12 is held in the holder 22, and the headrest 3 is not returned.

A step-less lock may be realized by deformation, not by setting a coefficient of friction. Namely, the apparatus may be configured so that the outer casing 15 is deformed by the load F from a passenger's head, and the upper projection 23 and lower projection 25 dig into each other.

Namely, the upper projection 23 and lower projection 25 are formed as substantially semicircular chokes made of iron. The upper projection 23 and lower projection 25 linearly contact the resin outer casing 15, and the contact area is narrow. Therefore, when the load F is applied from a passenger's head, a large vertical stress is generated. Therefore, a part of the surface of the outer casing 15 is easily deformed, and the upper projection 23 and lower projection 25 made of iron engage with each other. As a result, a resistance is generated, and the headrest 3 is not returned downward. In such a configuration, a step-less lock mechanism is securely realized as in the case of using a frictional resistance.

Figure 12:
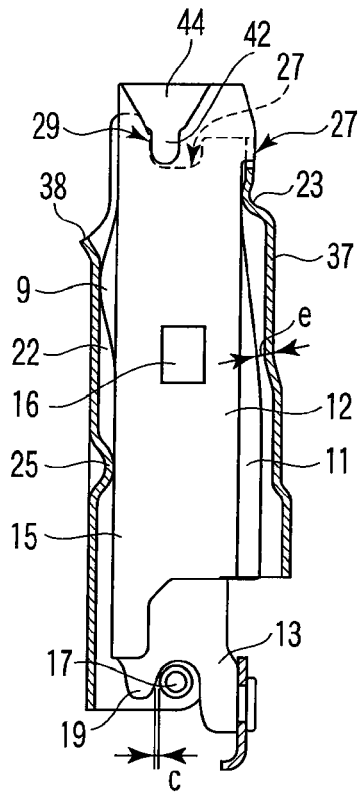
FIG. 12 is a sectional view of another example of a holder.

FIG. 12 shows an engagement projection 17 and a notch 18. The engagement projection 17 is cylindrical, and is covered by an outside cover material 31 made of elastic material such as rubber, as shown in FIG. 14. A washer 26 is provided at the base of the outside cover material 31. The engagement projection 17 is secured by caulking to the lower part of the left and right sidewalls of the holder 22 (or 24).

The engagement projection 17 may be provided on one of the left and right sidewalls. Instead of using the washer 26, a flange may be provided in the engagement projection 17 as one piece. If a flange is formed as one piece with the engagement projection 17, the manufacturing cost is reduced, a clearance to the notch 18 can be reduced, and noise can be prevented. The engagement projection 17 may be directly secured to the holder 22, without providing the washer 26 or a flange in the engagement projection 17.

The engagement projection 17 is projected into the holder 24. When the support bracket 12 is held in the holder 22, the engagement projection 17 fits in the notch 18 formed in the lower part of the support bracket 12.

Figure 13:
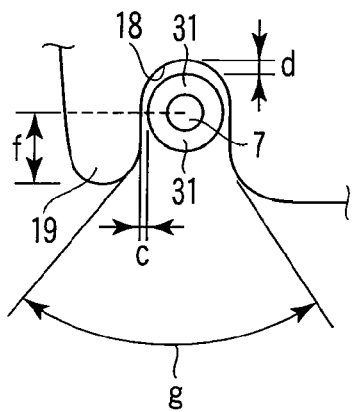
FIG. 13 is a view of an engagement projection.

The notch 18 has a clearance c to the engagement projection 17 in the longitudinal direction (with respect to a vehicle), as shown in FIG. 13. The engagement projection 17 has a clearance d to the upper part of the notch 18. The value of the clearance c is smaller than the clearance e between the holder 22 and the support bracket 12, at the mid position of the support bracket 12, as shown in FIG. 12. The clearance d is formed relatively wide to prevent direct contact between the engagement projection 17 and the notch 18.

The notch 18 is formed deep. An extension piece 19 is formed in the lower part of the support bracket 12. The extension piece 19 is formed with the lower end at least lower than the center of the engagement projection 17. In FIG. 13, the extension piece 19 is formed with the lower end lower than the center of the engagement projection 17 by a distance f. In this case, it is preferable that the end edge of the engagement projection 17 close to the notch 18 is extended linearly, and the end edges before and after the notch 18 are parallel. The lower part of the notch 18 is expanded downward at an angle of g. Therefore, the notch 18 is formed so that the engagement projection 17 smoothly fits into the notch 18. The distance f and angle g are to be appropriately set according to the path and inclination of the support bracket 12 when returning into the holder 22.

As described above, the engagement projection 17 is formed in the holder 22, and the notch 18 is formed in the support bracket 12. Therefore, when the support bracket 12 is held in the holder 22, the sidewall on the reverse surface of the support bracket 12 contacts the upper projection 23, and the sidewall on the front surface of the support bracket 12 contacts the lower projection 25. In addition, the engagement projection 17 is fitted in the notch 18 with clearance c while simultaneously being in contact with the elastic outside cover material 31. Therefore, the support bracket 12 is securely held in the holder 22, and the headrest 3 does not rattle when a vehicle is running. This makes it possible to provide a headrest inclining mechanism which does not incline the headrest 3 forward even if the headrest 3 is pushed forward from a rear seat. Incidentally, the whole engagement projection 17 may be made of resin.

Figure 16:
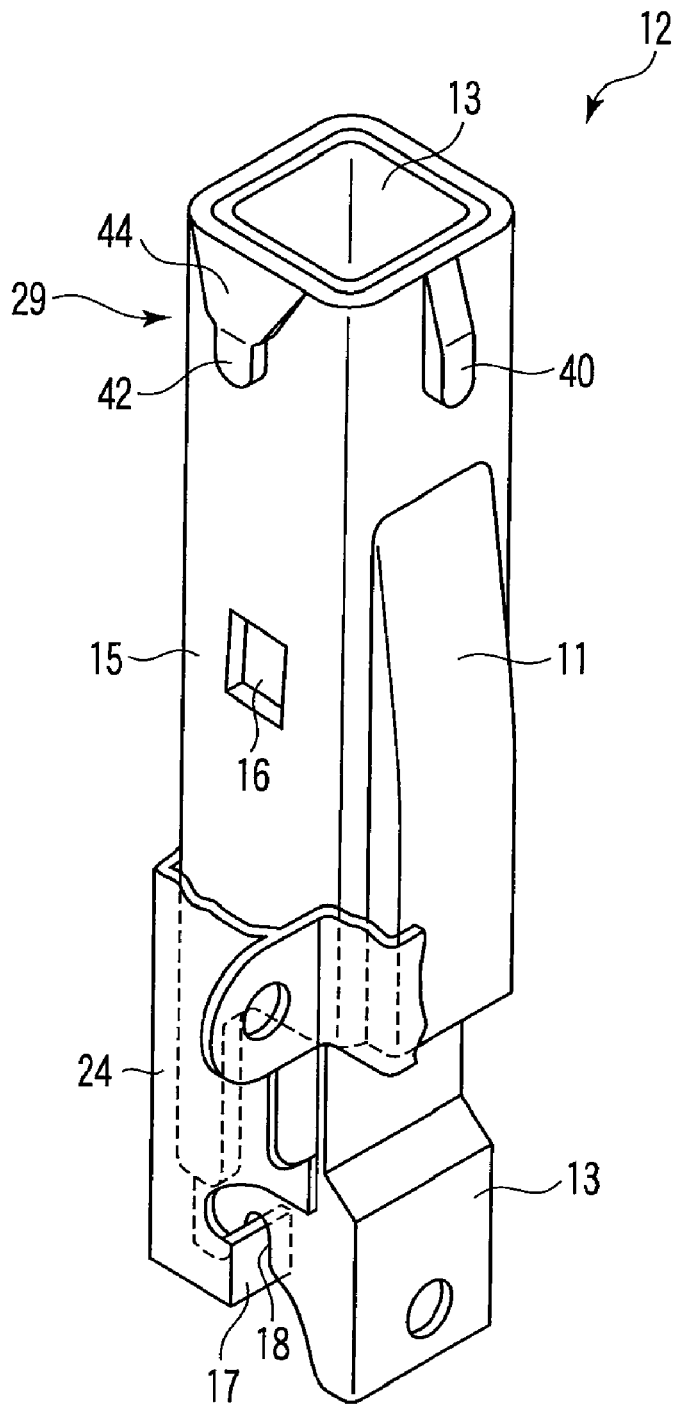
FIG. 16 is a perspective view of another example of a support bracket.

FIG. 15 and FIG. 16 show another example of the engagement projection 17. In this example, the engagement projection 17 is formed by bending the lower part of a wall forming the holder 22 to the inside of the holder 22. In this case, the notch 18 its the engagement projection 17 with the clearance c in the longitudinal direction, as described above. In this configuration, the engagement projection 17 does not need to be molded as a separate part, assembling of the parts is unnecessary, and the engagement projection 17 can be easily molded at a lot cost.

Figure 17:
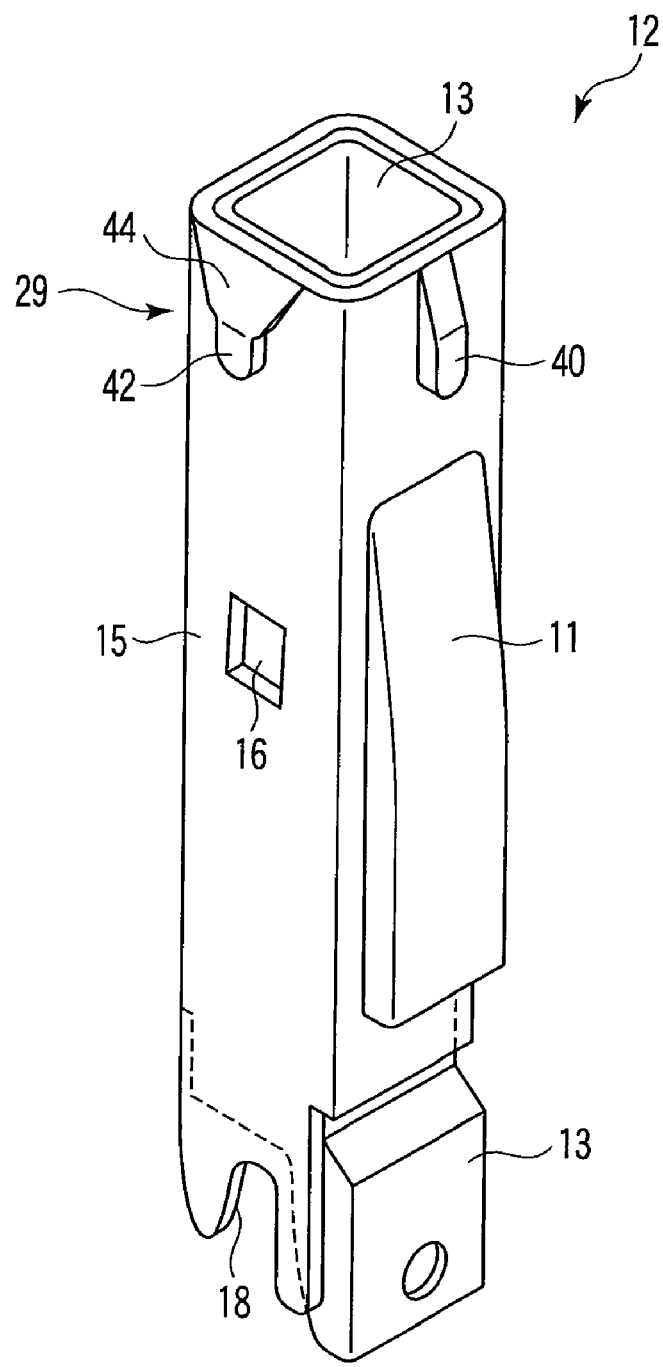
FIG. 17 is a perspective view of another example of a support bracket.

Further, as shown in FIG. 17, the outer casing 15 may be extended downward, and the notch 18 may be formed in the lower part of the outer casing 15. The notch 18 is molded as one piece with the outer casing 15 when the outer casing is formed by resin injection molding.

In such a configuration, the notch 18 can be molded in an accurate shape low cost compared with the case of metal press molding. This makes it possible to provide the headrest inclining apparatus 2 in which noise is minimized and the metal parts do not contact each other in the notch 18, at a low cost. In this case, even if the engagement projection 17 is made of metal, the metallic engagement projection 17 contacts the notch 18 made of resin (in other words, metallic members do not contact each other). Further, in this case, the engagement projection 17 need not be cylindrical, but as shown in FIG. 16, the projection engagement 17 is formed by bending a part of the holder 22, and then the notch 18 may be formed in the outer casing 15 to meet the engagement projection 17.

Next, an explanation will be given on the returning mechanism of the support bracket 12 by referring to FIG. 18.

Figure 18:
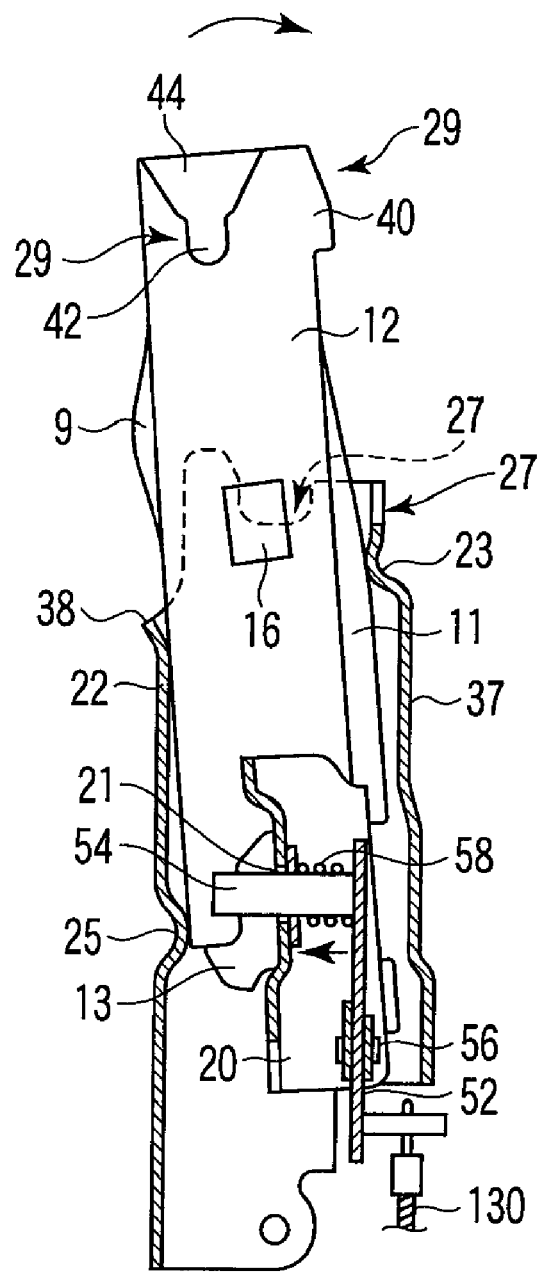
FIG. 18 is a sectional view of a holder.

FIG. 18 is a sectional view of the headrest driving mechanism 4 in FIG. 1, taken along the line A-A. FIG. 18 shows the state in which the sector gear 52 is rotated by the wire driving mechanism 6, and the connection pin 54 is moved up. Namely, the wire driving mechanism 6 causes tension in the wire 130, the sector gear 52 is rotated about the axis of rotation 56, and the connection pin 54 is moved up. When the connection pin 54 is moved up, the connection plate 20 is moved up through the connection hole 21, and the support bracket 12 is projected upward from the holder 22.

A coil spring 58 as an energizing means is provided between the sector gear 52 and connection plate 20. The sector gear 52 is provided rotatable to the frame support 30 through the axis of rotation 56. The coil spring 58 energizes the connection plate 20 in the direction of moving away from the sector gear 52, or to the left as seen in FIG. 18, regardless of the position of the support bracket 12.

Therefore, the support bracket 12 is always energized in the clockwise direction in the drawing, and contacts the upper projection 23 and lower projection 25. The support bracket 12 is energized in this direction at any position in the holder 22 (24). Therefore, even when the action of the wire 130 is released and the support bracket 12 is returned into the holder 22, the support bracket 12 always contacts the upper projection 23 and lower projection 25, and returns along the same path. Therefore, the support bracket 12 can be smoothly returned to the initial position without being caught by other members or parts in the holder 22.

As the returning path of the support bracket 12 can be set by the coil spring 58, it is unnecessary to estimate extra clearance between the support bracket 12 and other parts, rattling is prevented, and an operating noise is reduced.

Figure 19:
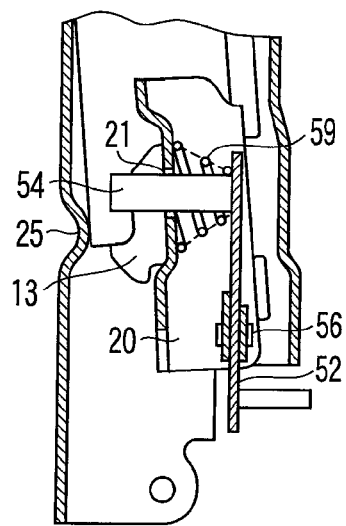
FIG. 19 is a sectional view of a part of a holder.
Figure 20:
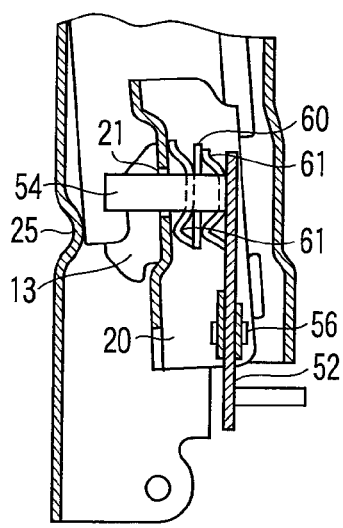
FIG. 20 is a sectional view of a part of a holder.

As an energizing means, the coil spring 58 may be replaced by a coil spring 59 wound conical as shown in FIG. 19. In this case, even if the connection hole 21 is elliptical, a flat washer is unnecessary. Further, as shown in FIG. 20, a wave washer 61 may be combined with a flat washer 60. A flat head spring (not shown) may be used instead of the wave washer 61. A spirally wound leaf spring (not shown) may be used instead of a coil spring.

Figure 21:
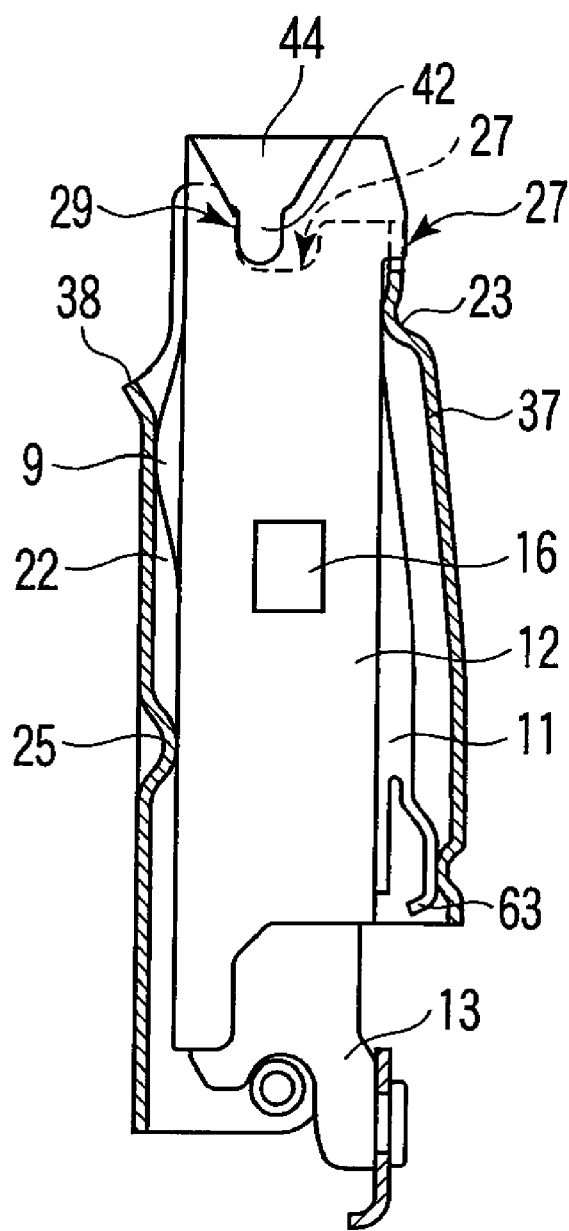
FIG. 21 is a sectional view of a holder.
Figure 22:
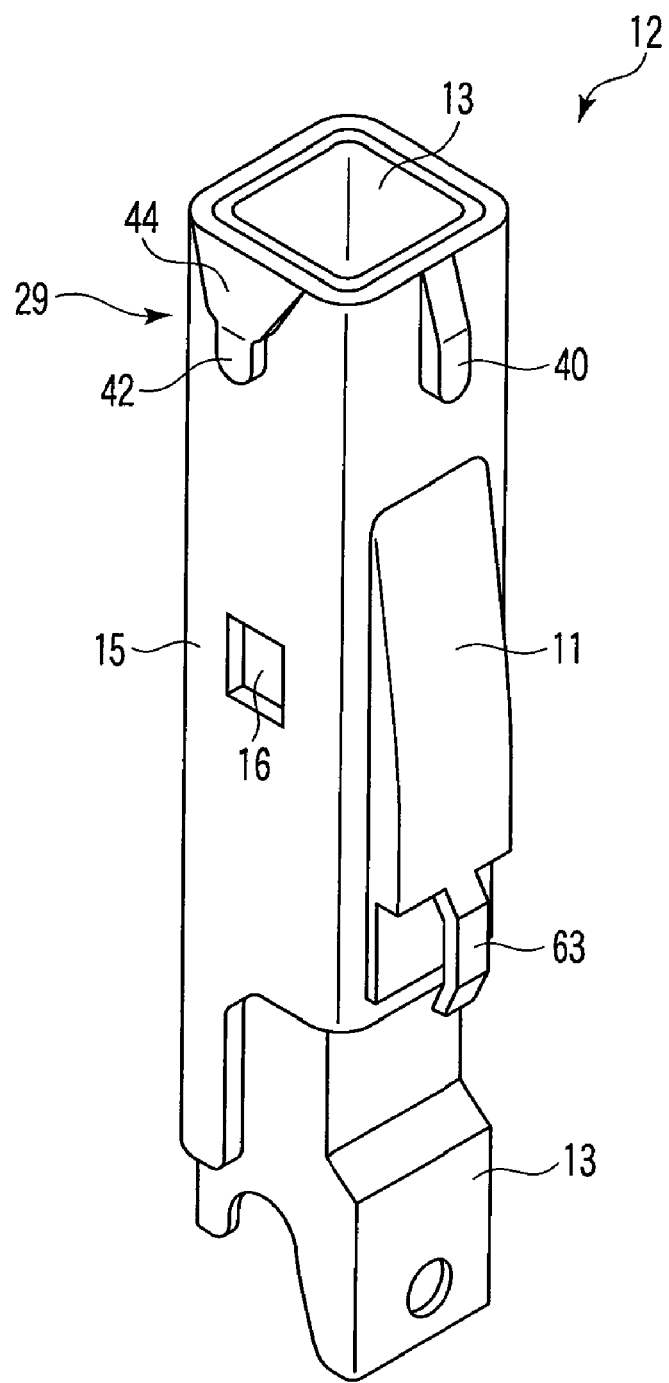
FIG. 22 is a perspective view of another example of a support bracket.

FIG. 21 and FIG. 22 show another example of an energizing means. In this example, a projection piece 63 is provided as an elastic piece in the upper part of the outer casing 15. The projection piece 63 contacts the rear wall of the holder 22. The projection piece 63 is formed as one piece with the outer casing 15 by injection molding. The projection piece 63 is formed to be always pressed to the inside of the rear wall of the holder 22 by a predetermined elastic force when the support bracket 12 is moved up and down in the holder 22. FIG. 22 is a perspective view showing the projection piece 63.

As the projection piece 63 is formed as described above, an energizing means can be easily formed at a low cost. Further, as the projection piece 63 is made of resin, even when the projection piece 63 is moved in being pressed to the inside of the holder 22, a rubbing or striking sound caused by metallic parts is not generated, and the support bracket 12 can be quietly moved.

Figure 23:
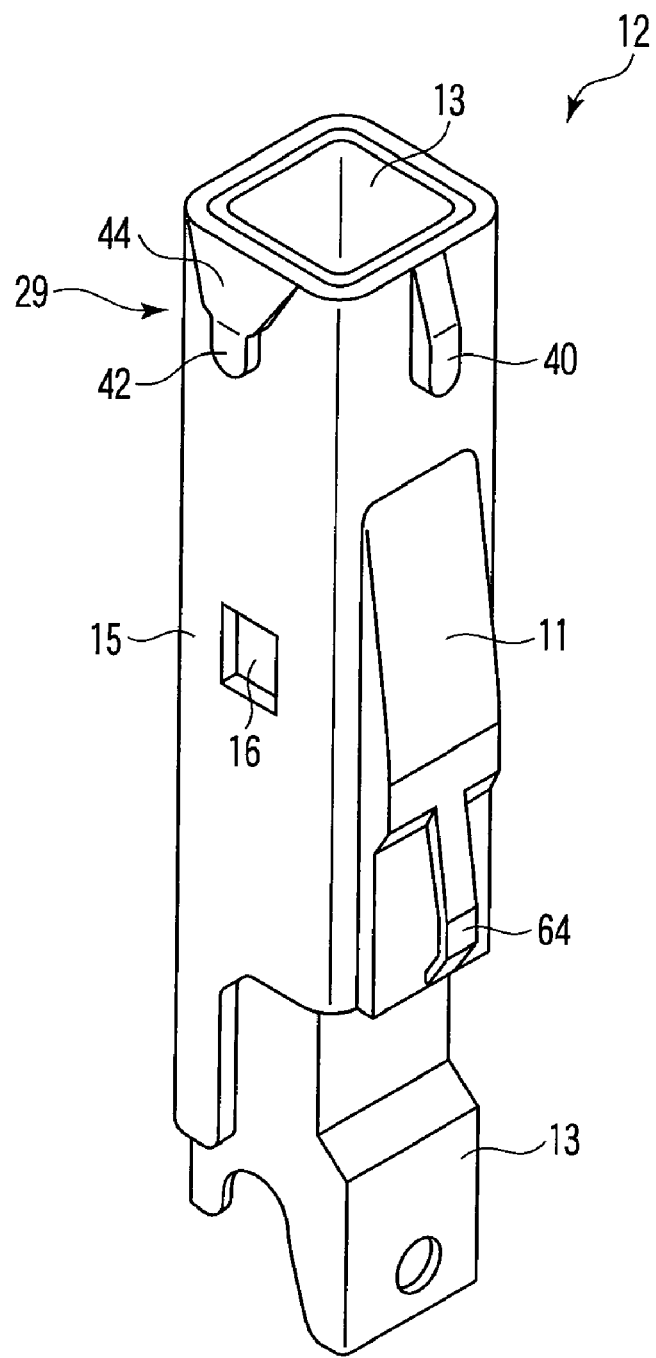
FIG. 23 is a perspective view of another example of a support bracket.

Further, the energizing means may not be formed with one side opened, like a cantilever. Namely, as shown in FIG. 23, the upper and lower ends of the energizing means may be made to contact the outer casing 15, and the middle part may be formed as a space. Thus, the energizing means is formed as a projection 64 with both ends closed. As the projection 64 is formed as described above, the load-carrying capacity is increased compared with the projection piece 63. In either case, the length, width and thickness of the projection 64 or the projection piece 63 are selected according to a target load and the kind of the resin material forming the outer casing 15. The energizing means may be formed emboss, instead of forming as a projection piece.

The present invention is applicable to a headrest of a vehicle seat, for example.

What is claimed is:

1. A headrest inclining apparatus which receives pressure from a passenger and inclines a headrest to a front side of a vehicle, and which comprises a headrest drive provided in an upper part of a vehicle seat back, a wire drive provided in a lower part of the seat back, and a tension transmission member connecting the headrest drive and the wire drive,
wherein:
the headrest drive includes a support bracket to fix the headrest, a holder to hold the support bracket to be slidable in a vertical direction, and an actuator to move the support bracket upward,
a projection projecting to inside of the holder is provided in an upper part of a rear wall, with respect to the vehicle, of the holder,
a cam crest corresponding to the projection is formed in the support bracket, and
a coefficient of friction between the projection and cam crest is higher than a predetermined value, and when the headrest is pressed by a passenger's head, the projection locks the cam crest by frictional resistance at a position where the headrest is pressed.

2. The headrest inclining apparatus according to claim 1, wherein a projection projecting to inside of the holder is provided in a lower part of a front wall, with respect to the vehicle, of the holder.

3. The headrest inclining apparatus according to claim 2, wherein cam crests are formed on both front and rear sides of the support bracket.

4. The headrest inclining apparatus according to claim 3, wherein one of the cam crests formed on the front and rear sides of the support brackets is formed flat.

5. The headrest inclining apparatus according to claim 4, wherein the cam crests are made of a deformable material, and when the headrest is pressed by a passenger's head, the cam crests are deformed and secured to the projections at the position where the headrest is pressed.

6. The headrest inclining apparatus according to claim 5, wherein a spring member is provided, and when the pressure from a passenger's head to the headrest is released, the support bracket is housed in the holder by the spring member.

7. The headrest inclining apparatus according to claim 6, wherein the holder includes a slope with a front side up, the slope being formed on at least one of right and left sides, with respect to the vehicle, at an upper end of the holder, a contact part corresponding to the slope is provided in an upper part of the support bracket, and when the support bracket is housed in the holder, the front and rear sides of the support bracket come into contact with an inside surface of the holder, and the contact part comes into contact with the slope.

8. The headrest inclining apparatus according to claim 6, wherein:
a first engagement part is formed as a notch and provided on at least one of right and left sides at an upper end of the holder, the first engagement part comprising an inclined part which expands upward, and an elongate part continuous with the inclined part and extending in parallel with a longitudinal direction of the holder;
a second engagement part is formed as a stage opposed to the first engagement part and provided on an upper portion of the support bracket, the second engaging part comprising an inclined part which expands upward, and an elongate part continuous with the inclined part and extending in parallel with the longitudinal direction of the holder, and
when the support bracket is housed in the holder, the front and rear sides of the support bracket come into contact with an inside surface of the holder, and the inclined part of the second engagement part comes into contact with a slope located at a front of the inclined part of the first engagement part.

9. A headrest inclining apparatus which receives pressure from a passenger and inclines a headrest to a front of a vehicle, and which comprises a headrest drive provided in an upper part of a vehicle seat back, a wire drive provided in a lower part of the seat back, and a tension transmission member connecting the headrest drive and the wire drive,
wherein:
the headrest drive includes a support bracket to fix the headrest, a holder to hold the support bracket to be slidable in a vertical direction, and an actuator to move the support bracket upward, and
projections projecting to inside of the holder are provided in an upper part of a rear wall, with respect to the vehicle, of the holder and in a lower part of a front wall of the holder,
a cam crest corresponding to one of the projections is formed in the support bracket,
an engagement projection is provided in a lower part of the holder, and
a notch is formed in a lower part of the support bracket, and when the support bracket is held in the holder, the engagement projection is fitted in the notch, with a predetermined clearance maintained in a longitudinal direction of the vehicle.

10. The headrest inclining apparatus according to claim 9, wherein the engagement projection is cylindrical, and is provided with an elastic material on a periphery thereof.

11. The headrest inclining apparatus according to claim 9, wherein the engagement projection is formed by bending a lower end of a peripheral wall of the holder to inside of the holder.

12. The headrest inclining apparatus according to claim 11, wherein the support bracket comprises a metallic inner cylinder, and an outer casing secured to a periphery of the inner cylinder, the notch is formed at a lower end of the outer casing, and the notch is fitted with the engagement projection.

13. A headrest inclining apparatus which receives pressure from a passenger and inclines a headrest to a front of a vehicle, and which comprises a headrest drive provided in an upper part of a vehicle seat back, a wire drive provided in a lower part of the seat back, and a tension transmission member connecting the headrest drive and the wire drive,
wherein:
the headrest drive includes a pair of support brackets to fix the headrest, the support brackets being provided on right and left sides of a connection member,
the headrest drive includes holders to hold the support brackets to be slidable in a vertical direction, and an actuator to move the support brackets upward,
in each of the holders, projections projecting to inside of the holder are provided in an upper part of a rear wall, with respect to the vehicle, of the holder and in a lower part of a front wall of the holder,
a cam crest corresponding to one of the projections is formed in each of the support brackets, and
energizing means is provided between the connection member and the actuator, and upper parts of the support brackets are always energized toward a rear side of the vehicle by the energizing means.

14. The headrest inclining apparatus according to claim 13, wherein the energizing means is a spring member provided between the connection member and the actuator.

15. The headrest inclining apparatus according to claim 14, wherein an engagement projection is provided in a lower part of each of the holders, and
in each of the support brackets, a notch is formed in a lower part of the support bracket, and when the support bracket is held in the holder, the notch is fitted with the engagement projection in a longitudinal direction, with respect to the vehicle, with a predetermined clearance.

16. The headrest inclining apparatus according to claim 13, wherein:
an engagement projection is provided in a lower part of each of the holders, and
in each of the support brackets, a notch is formed in a lower part of the support bracket, and when the support bracket is held in the holder, the notch is fitted with the engagement projection in longitudinal direction, with respect to the vehicle, with a predetermined clearance.

17. A headrest inclining apparatus which receives pressure from a passenger and inclines a headrest to a front of a vehicle, and which comprises a headrest drive provided in an upper part of a vehicle seat back, a wire drive provided in a lower part of the seat back, and a tension transmission member connecting the headrest drive and the wire drive,
wherein:
the headrest drive includes a pair of support brackets to fix the headrest, the support brackets being provided on right and left sides of a connection member,
the headrest drive includes holders to hold the support brackets to be slidable in a vertical direction, and an actuator to move the support brackets upward,
each of the support brackets comprises a metallic inner cylinder, and an outer casing secured to a periphery of the inner cylinder,
in each of the holders, projections projecting to inside of the holder are provided in an upper part of a rear wall, with respect to the vehicle, of the holder and in a lower part of a front wall of the holder, a cam crest corresponding to one of the projections is formed in each of the support brackets, and in each of the support brackets, the outer casing comprises an elastic piece formed in one piece with the outer casing and projecting rearward of the support bracket, the elastic piece is in contact with the inside of the holder at all times in a range in which the support bracket moves up and down inside the holder, and an upper part of the support bracket is always energized to a rear side of the vehicle by the elastic piece.

18. The headrest inclining apparatus according to claim 17, wherein an engagement projection is provided in a lower part of each of the holders, and in each of the support brackets, a notch is formed in a lower part of the support bracket, and when the support bracket is held in the holder, the notch is fitted with the engagement projection in a longitudinal direction, with respect to the vehicle, with a predetermined clearance.

* * * * *